US008511947B2

(12) United States Patent
Pei

(10) Patent No.: US 8,511,947 B2
(45) Date of Patent: Aug. 20, 2013

(54) CUTTING APPARATUS WITH CUTTING DEVICE

(75) Inventor: Shao-Kai Pei, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 504 days.

(21) Appl. No.: 12/869,772

(22) Filed: Aug. 27, 2010

(65) Prior Publication Data

US 2011/0314983 A1 Dec. 29, 2011

(30) Foreign Application Priority Data

Jun. 28, 2010 (TW) .................................. 99121120

(51) Int. Cl.
*B23B 41/06* (2006.01)
*B26D 1/12* (2006.01)

(52) U.S. Cl.
USPC ............................................ 408/204; 83/663

(58) Field of Classification Search
USPC .................. 83/168, 171, 663, 678, 877, 880, 83/881, 883; 408/23, 25, 68, 147, 204; 451/242, 460
See application file for complete search history.

(56) References Cited

U.S. PATENT DOCUMENTS 4,610,579 A * 9/1986 Frank et al. .................... 408/60
6,220,949 B1 * 4/2001 Hayashi et al. ............... 451/548

* cited by examiner

*Primary Examiner* — Alexander P Taousakis
(74) *Attorney, Agent, or Firm* — Altis Law Group, Inc.

(57) ABSTRACT

A cutting device includes a fixing plate, a revolving cylinder, an annular cutting blade, and an ejection bar. The fixing plate defines a first through hole. The revolving cylinder is threadedly engaged in the first through hole and defines a second through hole. The cutting blade defines a third through hole and is attached to the revolving cylinder. The revolving cylinder is rotatable relative to the fixing plate to move the cutting blade between an extended position and a retracted position. In the extended position, the cutting blade cuts a surface of the workpiece to create a round blind crack in the surface thereof, a portion of the workpiece being surrounded by the blind crack. In the retracted position, the cutting blade is moved away from the workpiece. The ejection bar is configured for pushing the surrounded portion out of the workpiece.

18 Claims, 12 Drawing Sheets

CUTTING APPARATUS WITH CUTTING DEVICE

BACKGROUND

1. Technical Field

The disclosure generally relates to cutting devices and, particularly, to a cutting apparatus with a cutting device for cutting a workpiece.

2. Description of Related Art

Infrared (IR) cut-off filters are configured to reflect or block mid-infrared wavelengths while passing visible light, and are generally equipped in cameras as key elements thereof. The IR cut-off filters are manufactured by forming IR cut-off films on respective substrates. A roll grinding apparatus is generally used to round and/or polish surfaces of the substrates before or after the IR cut-off films are formed on the substrates.

Referring to FIG. 11 and FIG. 12, a typical roll grinding apparatus includes a grinding wheel 11 and a pair of clamping members 13. In a roll grinding process, the clamping members 13 cooperate to clamp a number of stacked cuboid-shaped substrates 12. The cuboid-shaped substrates 12 clamped by the clamping members 13 are rounded by the grinding wheel 11 to become substantially cylindrical substrates 120, as shown in FIG. 12.

Generally, to attain a cylindrical substrate 120 with good circularity, it is necessary for principal axes of the substrates 12 to be coaxially aligned with the two clamping members 13, before the substrates 12 are rounded. However, it is very difficult for the clamping members 13 to be aligned with principal axes of the substrates 12. The substrates 12 may thus result in inferior circularity of the cylindrical substrates 120.

Therefore, what is needed, is a cutting apparatus with a cutting device, which can overcome the above shortcomings.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Embodiment of the cutting apparatus will now be described in detail below and with reference to the drawings.

Referring to FIG. 1 to FIG. 4, a cutting apparatus 100 in accordance with an exemplary embodiment is shown. The cutting apparatus 100 includes a chamber 10, a positioning mechanism 20, and a number of cutting devices 30.

Figure 1:
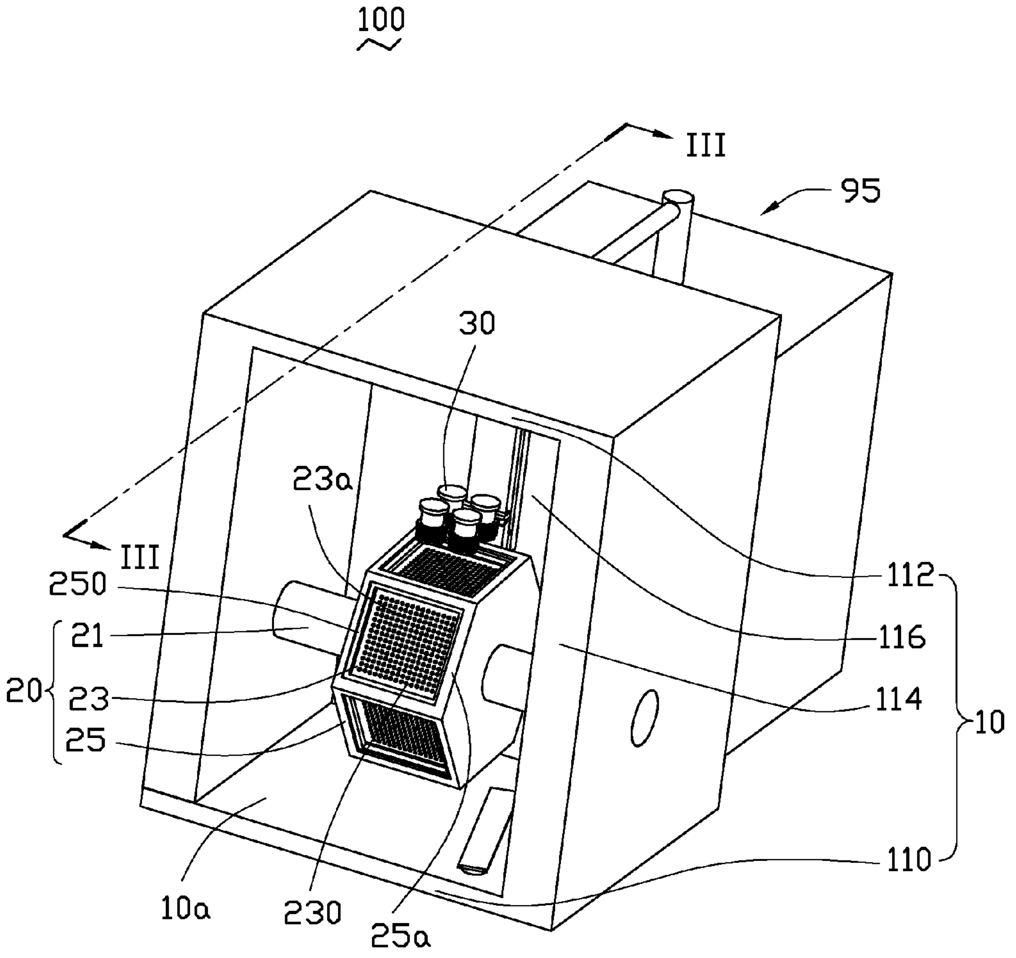
FIG. 1 is an isometric view of a cutting apparatus with a number of cutting device in accordance with an exemplary embodiment, as seen from the front of the cutting apparatus.
Figure 2:
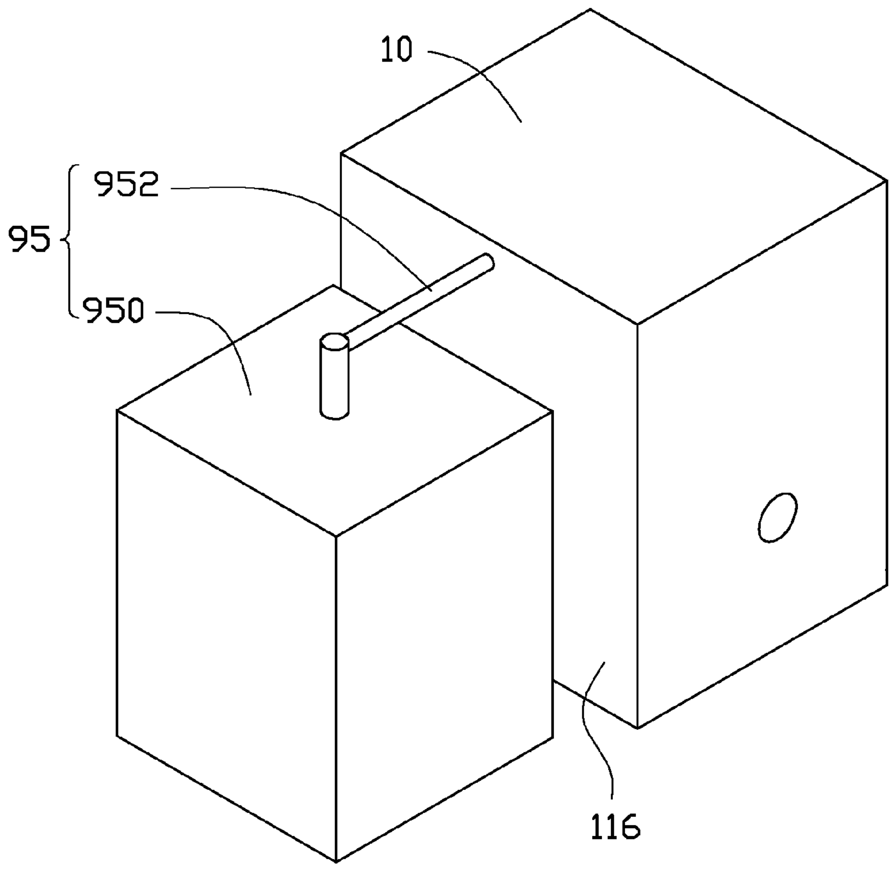
FIG. 2 is an isometric view of a cutting apparatus of FIG. 1, as seen from the rear of the cutting apparatus.

As shown in FIG. 1 and FIG. 2, the chamber 10 is cuboid-shaped. The chamber 10 includes a bottom board 110, a top board 112, two parallel first side boards 114, and a second side board 116. The bottom board 110 is substantially parallel to the top board 112. Each of the first side boards 114 is located between and adjoins the bottom board 110 and the top board 112. The second side board 116 is located between and adjoins the two first side boards 114, and the second side board 116 is located between and adjoins the bottom board 110 and the top board 112. The bottom board 110, the top board 112, the first side boards 114, and the second side board 116 cooperatively form a receiving space **10*a* recess toward an exterior of the chamber 10**.

The positioning mechanism 20 is secured in the receiving space **10*a* of the chamber 10. In this embodiment, the positioning mechanism 20 includes a drive shaft 21, a main body 23, and a supporting frame 25. The drive shaft 21 is arranged between the two first side boards 114. In a typical example, two opposite ends of the drive shaft 21 is coupled to the respective first side boards 114. Generally, a motor (not shown) can be provided and coupled to the drive shaft 21, thus the drive shaft 21 can be rotated by the motor. The main body 23 is arranged around and coupled to the drive shaft 21. The drive shaft 21 is used to rotate the main body 23. In this embodiment, the main body 23 is a polygonal prism with six peripheral surfaces 230. The drive shaft 21 extends through the main body 23. In alternative embodiments, the main body 23** may have another suitable shape, such as a substantially cylindrical shape.

In this embodiment, the main body 23 is in the form of a chamber with a cavity (not labeled) defined therein. The six peripheral surfaces 230 surround the cavity. Each of the peripheral surfaces 230 has a number of suction nozzles **23*a*** defined therein communicating with the cavity.

A configuration of the supporting frame 25 is shaped to confirm to that of the main body 23. The supporting frame 25 is arranged around the main body 23. In this embodiment, the supporting frame 25 includes six rectangular rims **25*a*. Each of the rectangular rims 25*a* has a rectangular recess 250 defined therein. The rectangular rims 25*a* are connected to one another around the main body 23 to enclose the main body 23 (see FIG. 1). The six peripheral surfaces 230 are exposed at the six respective recesses 250. A number of suction nozzles 23*a* are arranged in each of the recesses 250**.

Figure 3:
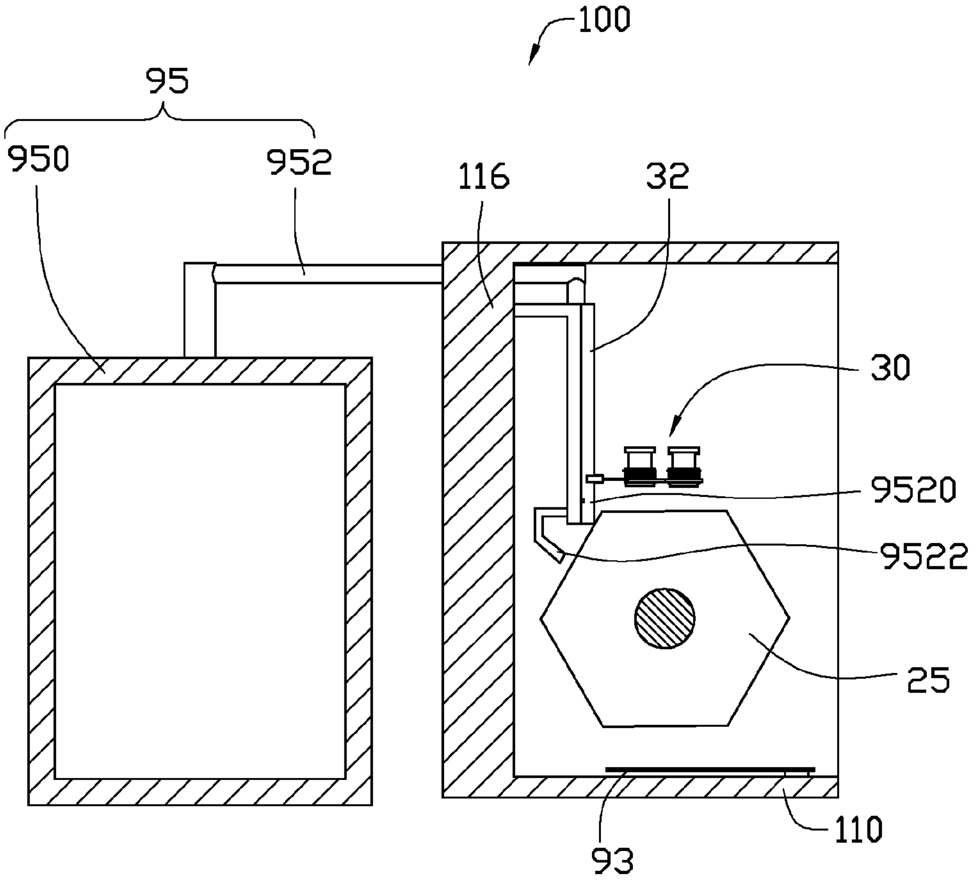
FIG. 3 is a cross section of the cutting apparatus of FIG. 1, taken along line III-III.
Figure 4:
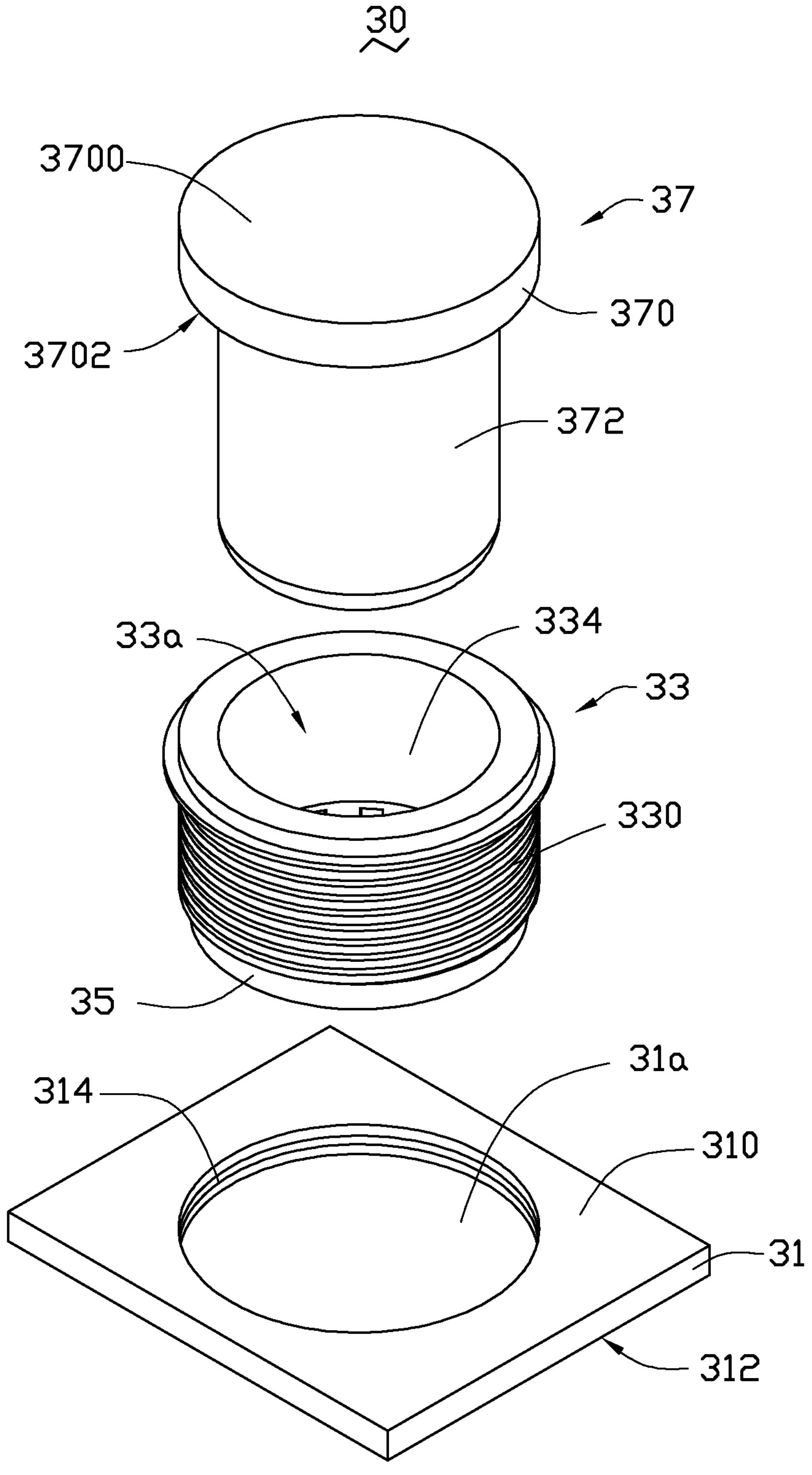
FIG. 4 is a disassembled view of a single cutting device of FIG. 1, as seen from the top of the cutting device.
Figure 5:
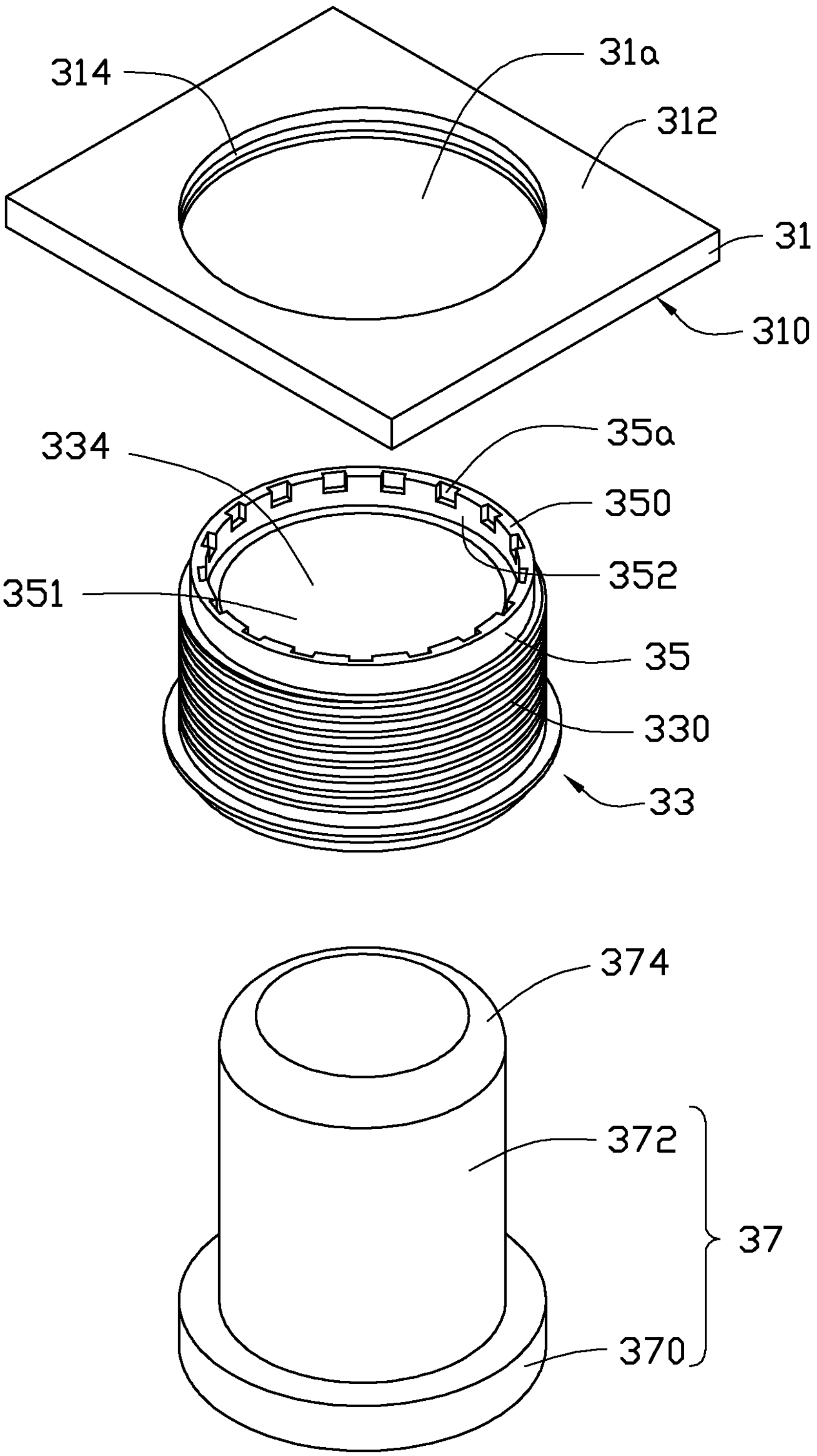
FIG. 5 is a disassembled view of the cutting device of FIG. 4, as seen from the bottom of the cutting device.

Referring to FIG. 1, FIG. 3 and FIG. 5, the cutting apparatus 100 includes four cutting devices 30. As shown in FIG. 4 and FIG. 5, each of the cutting devices 30 includes a fixing plate 31, a revolving cylinder 33, a cutting blade 35, and an ejection bar 37. The fixing plate 31 is generally cuboid-shaped, and includes a first surface 310 and a second surface 312 at opposite sides thereof. In this embodiment, the four first surfaces 310 of the four fixing plates 31 are coplanar, and the four fixing plates 31 can be made separately and connected to one another by applying adhesive therebetween. In alternative embodiments, the four fixing plates 31 can be integrally connected to one another. The four fixing plates 31 are connected to a fixed support 32. The fixed support 32 is fixed to the second side board 116 of the chamber 10.

The fixing plates 31 has a first through hole 31*a* defined in a central portion of the first surface 310. The first through hole 31*a* extends all the way through the second surface 312. In addition, the fixing plates 31 has interior threads 314 defined in an inner sidewall of the first through hole 31*a*.

The revolving cylinder 33 is generally cylindrical with a second through hole 33*a* defined in an axial direction thereof (see FIG. 4). An inner sidewall 334 of the second through hole 33*a* is smooth and does not have threads. An external surface (not labeled) of the revolving cylinder 33 has exterior threads 330 defined therein. The exterior threads 330 engage with the interior threads 314. The revolving cylinder 33 is arranged in the first through hole 31*a* and threadedly coupled to the fixing plates 31 by engagement of the interior threads 314 and the exterior threads 330.

The revolving cylinder 33 may be coupled to a motor (not shown) and thus rotated by the motor. The rotation of the revolving cylinder 33 moves the revolving cylinder 33 along the first through hole 31*a* as the exterior thread 330 engages with the interior thread 314.

The cutting blade 35 is generally cylindrical and includes an end face 350 facing away from the revolving cylinder 33. The cutting blade 35 has a third through hole 351 defined in the end face 350 along an axial direction thereof (see FIG. 5). A cross section of the cutting blade 35 is generally annular. In this embodiment, a diameter of the cutting blade 35 is substantially equal to that of the revolving cylinder 33. The cutting blade 35 is attached to an end of the revolving cylinder 33, and the third through hole 351 is coaxially aligned with the second through hole 33*a*. As shown in FIG. 5, the cutting blade 35 includes an inner surface 352 in the third through hole 351. The inner surface 352 adjoins the end face 350. The cutting blade 35 has a number of recesses 35*a* defined in the inner surface 352. The recesses 35*a* are dispersed around an axis of the cutting blade 35. Each of the recesses 35*a* is exposed at the end face 350.

Figure 6:
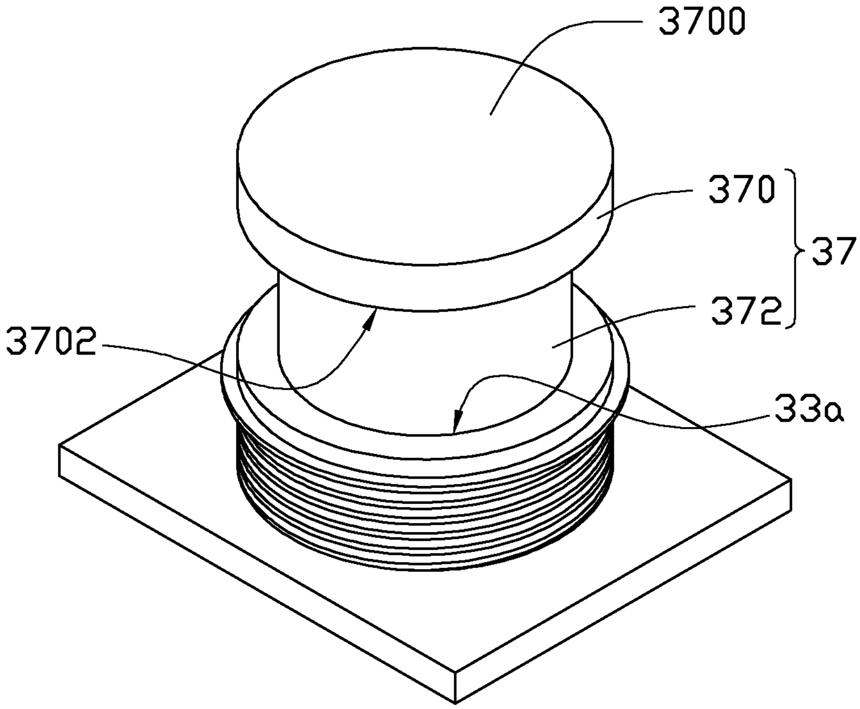
FIG. 6 is an assembled view of the cutting device of FIG. 4.

Referring also to FIG. 6, the ejection bar 37 includes a base portion 370 and a protruding portion 372. The base portion 370 and the protruding portion 372 each are substantially cylindrical. The base portion 370 includes a first end face 3700 and a second end face 3702 at opposite sides thereof. The protruding portion 372 protrudes from the second end face 3702. As shown in FIG. 6, a diameter of the protruding portion 372 is substantially equal to that of the second through hole 33*a*, and is less than that of the base portion 370. Thus, the protruding portion 372 can be inserted in the second through hole 33*a*. The base portion 370 can be used to restrain movement of the protruding portion 372 in the second through hole 33*a*. In this embodiment, an end 374 of the protruding portion 372 distant from the base portion 370 may have a chamfer or a fillet defined therein. Thus, the protruding portion 372 can be easily inserted into the second through hole 33*a*. In this embodiment, the end 374 has a chamfer defined therein. In addition, a suction nozzle (not shown) can be provided to hold the ejection bar 37 by attaching and providing a suction force to the first end face 3700. Furthermore, the suction nozzle can be coupled to a cantilever (not shown), thus the ejection bar 37 can be moved by the cantilever to slide the protruding portion 372 along the second through hole 33*a*.

The cutting apparatus 100 may include a control unit (not shown) and a cooling device 95. In use, the control unit can be used to control rotation of the drive shaft 21. In this embodiment, the cooling device 95 includes a storage tank 950 and a tube 952 (see FIG. 3). The storage tank 950 is arranged adjacent to the chamber 10 and configured for receiving coolant such as water. The tube 952 is configured for transporting the coolant and ejecting the coolant to the cutting device 30. The tube 952 can be a pipe or a hose. In this embodiment, the tube 952 is connected to the storage tank 950 and extends through the second side board 116 to a position adjacent to the cutting blade 35. The tube 952 includes a first nozzle 9520 and a second nozzle 9522. The first nozzle 9520 is located at the working position and opens toward the cutting blade 35. The second nozzle 9522 is located adjacent to the supporting frame 25.

As shown in FIG. 7 to FIG. 10, the cutting devices 30 can be used to cut a workpiece 80. In this embodiment, the workpiece 80 can be made of glass. A configuration of the glass workpiece 80 can be shaped to confirm to the recess 250 of the supporting frame 25. That is, the workpiece 80 can be cuboid-shaped.

In operation, the control unit controls the motor coupled to the drive shaft 21 to switch on, and the drive shaft 21 is rotated by the motor. Accordingly, the drive shaft 21 rotates the main body 23 and the supporting frame 25.

Figure 7:
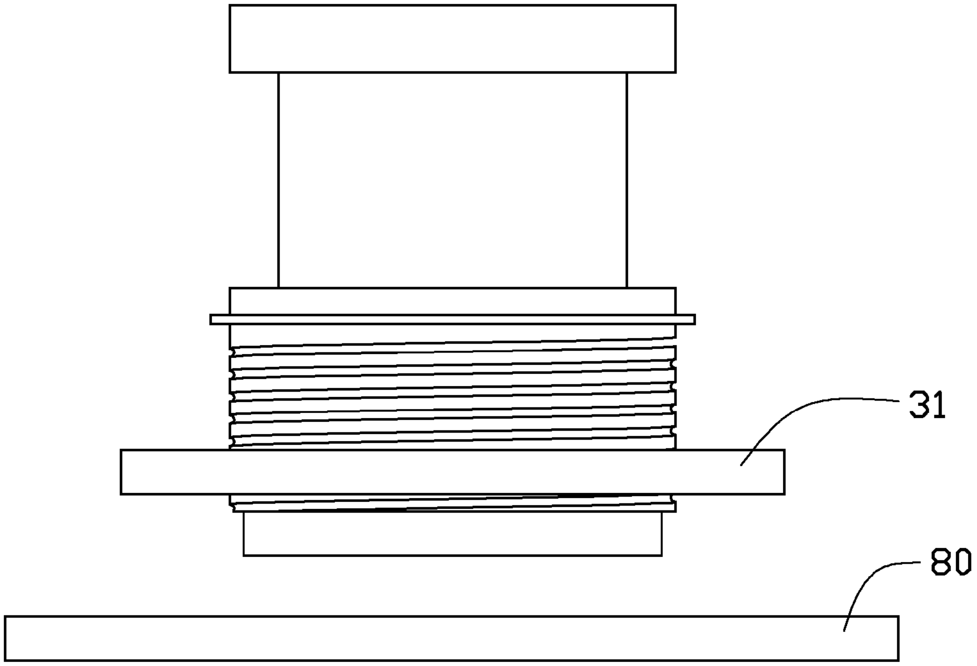
FIG. 7 is a schematic view of the cutting device of FIG. 6 together with a workpiece, showing the workpiece being located at a working position.

In one example, when any of the peripheral surfaces 230 is parallel to the second surface 312 of the fixing plate 31, the workpiece 80 can be arranged on the rectangular rim 25*a* to cover the recess 250. Thus, the workpiece 80 can be located at a working position. In this embodiment, when the workpiece 80 is located at the working position, the workpiece 80 is substantially parallel to the fixing plate 31, as shown in FIG. 7. In another example, the workpiece 80 can be arranged on the rectangular rim 25*a* to cover the recess 250, before the peripheral surface 230 is parallel to the second surface 312 of the fixing plate 31. The workpiece 80 can be parallel to the fixing plate 31 by rotating the supporting frame 25 to locate the workpiece 80 at the working position.

Figure 8:
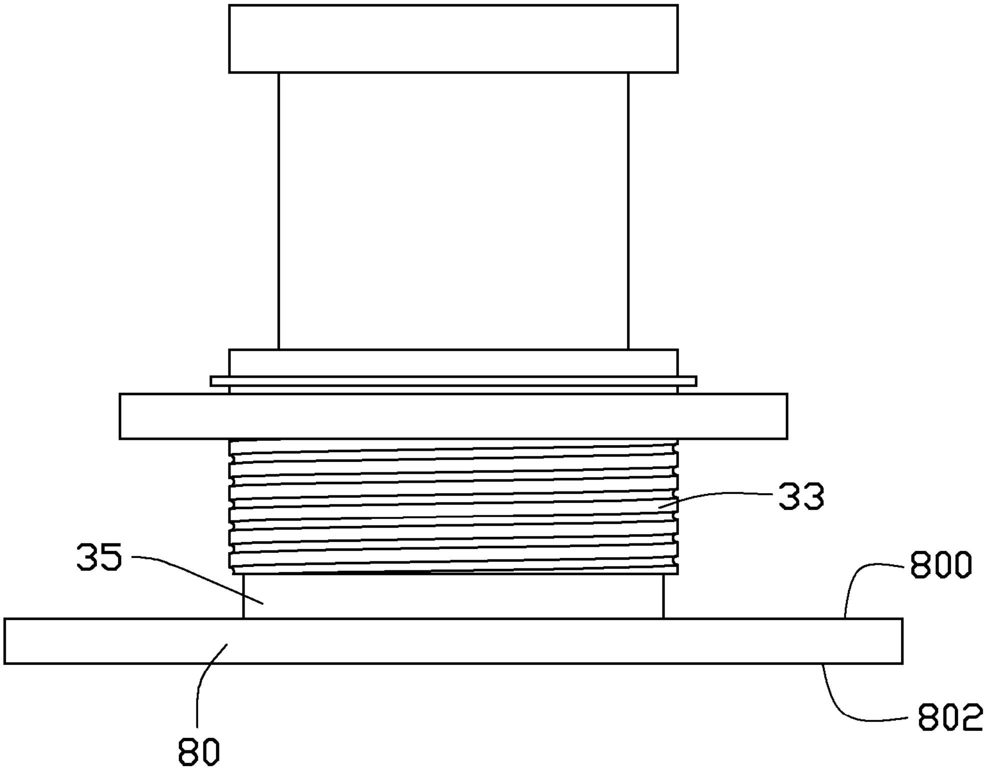
FIG. 8 is similar to FIG. 7, but showing the cutting device operating in an extended position.
Figure 10:
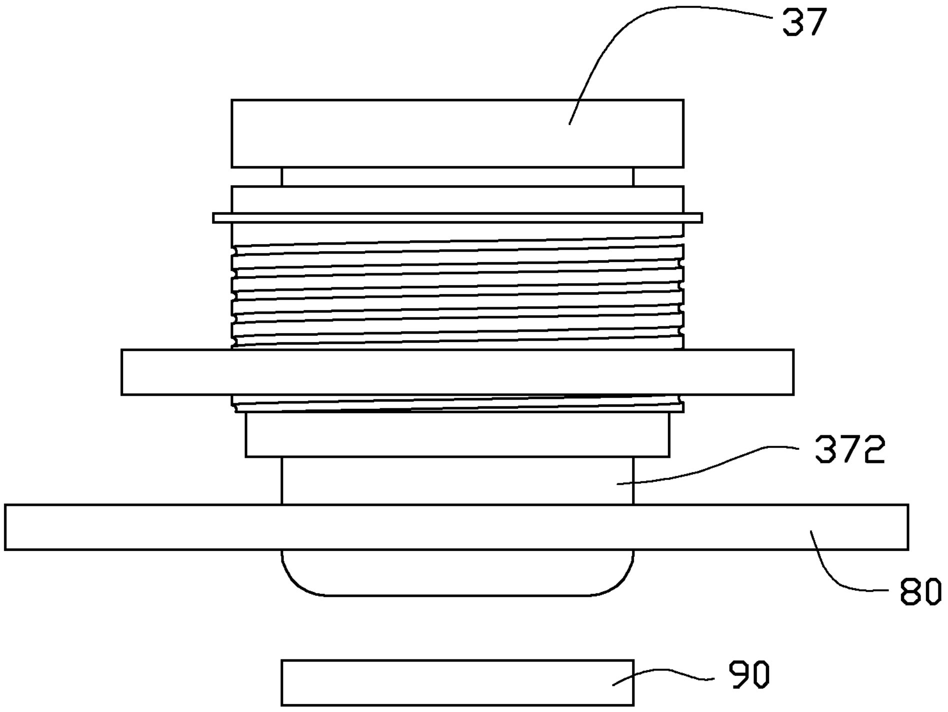
FIG. 10 is similar to FIG. 9, but showing a portion is separated from the workpiece.
Figure 11:
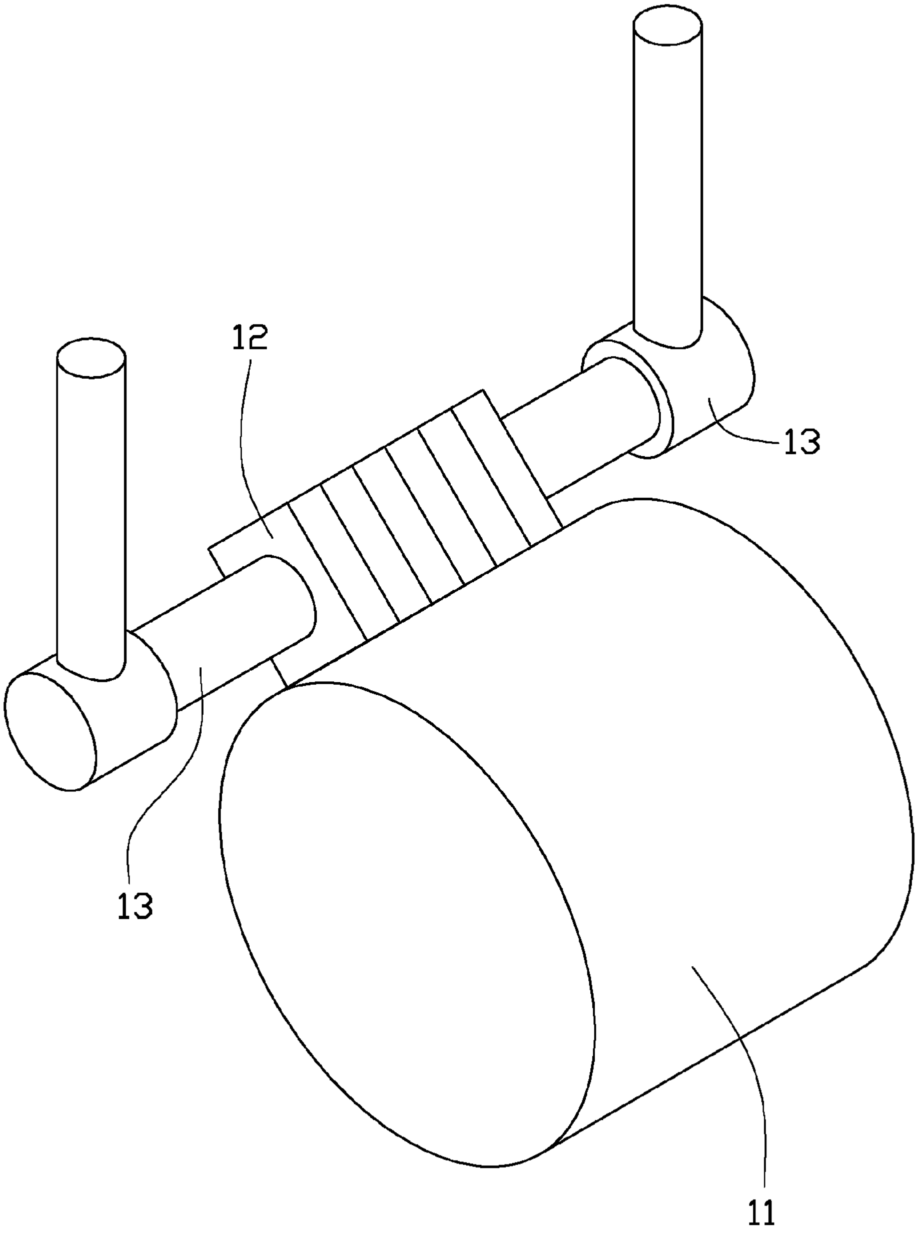
FIG. 11 (RELATED ART)
FIG. 11 is an isometric view of a typical roll grinding apparatus with a number of cuboid-shaped substrates.
Figure 12:
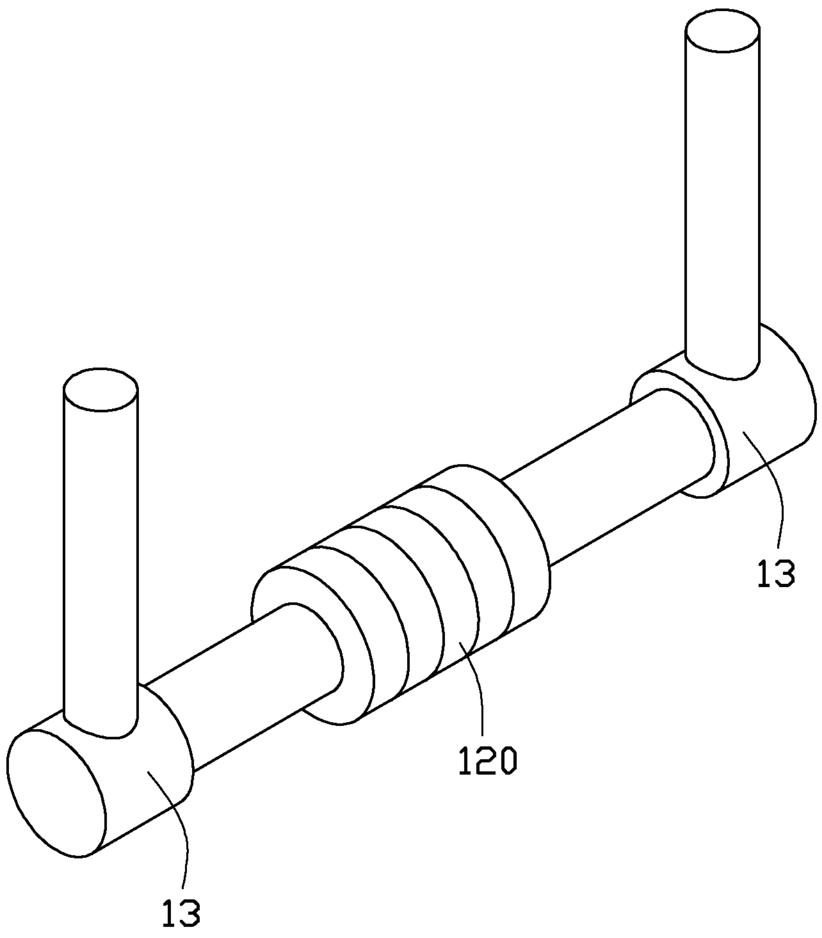
FIG. 12 (RELATED ART)
FIG. 12 is similar to FIG. 11, but showing the cuboid-shaped substrates being shaped into cylindrical substrates.

Referring also to the FIG. 8, the motor coupled to the revolving cylinder 33 can be used to rotate the revolving cylinder 33 clockwise (or counter-clockwise), thus moving the revolving cylinder 33 toward the workpiece 80. Accordingly, the cutting blade 35 is moved toward the workpiece 80 by the revolving cylinder 33 to an extended position where the cutting blade 35 cuts the workpiece 80. In this embodiment, the cutting blade 35 rotates when cutting the workpiece 80. The four cutting blade 35*s* 33 can be rotated by the four respective motors to cut the workpiece 80 simultaneously, thus cutting four respective portions 90 (as shown in FIG. 10) from the workpiece 80. The portion 90 is generally cylindrical. A diameter of each portion 90 is equal to that of cutting blade 35 measured in the third through hole 351.

Figure 9:
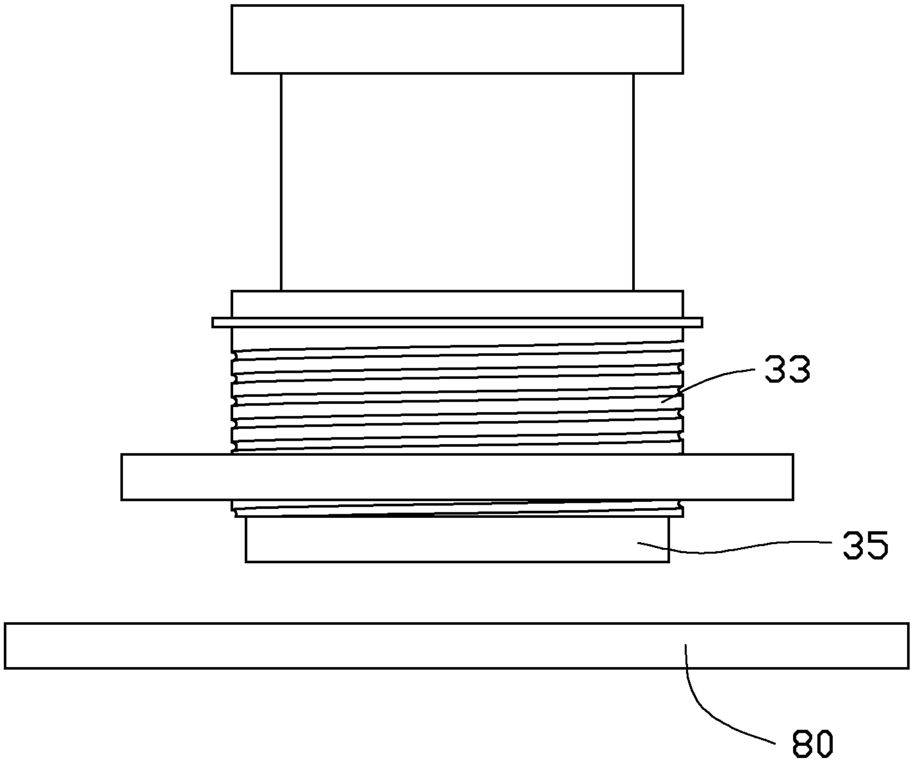
FIG. 9 is similar to FIG. 8, but showing the cutting device operating in an extracted position.

In this embodiment, the workpiece 80 is relatively thick, the cutting blade 35 can be used to cut the workpiece 80 to create a round blind crack in an upper surface 800 of the workpiece 80. The blind crack has a predetermined depth and does not extend all the way through a lower surface 802 at an opposite side thereof to the upper surface 800. The portion 90 is surrounded by the blind crack and partially connected to the workpiece 80. Furthermore, as shown in FIG. 9, the motor can be used to rotate the revolving cylinder 33 in a reversal direction, moving the cutting blade 35 to an extracted position where the cutting blade 35 is away from the workpiece 80.

Referring also to FIG. 10, when the cutting blade 35 is located in the extracted position, the ejection bar 37 can be used to push the surrounded portion 90 out of the workpiece 80. The portion 90 falls off toward the peripheral surface 230 of the main body 23. When the portion 90 is arranged on the peripheral surface 230, the suction nozzles 23*a* provide a suction force to hold the workpiece 80 on the supporting frame 25.

In alternative embodiments, the workpiece 80 may be relatively thin, the cutting blade 35 can be used to cut the workpiece 80 all the way through the lower surface 802, and the portion 90 can be directly separated from the workpiece 80.

Furthermore, the control unit can be used to control the drive shaft 21 to rotate again. During rotation, another peripheral surface 230 which is adjacent (or neighboring) to the previous peripheral surface 230 can be parallel to the second surface 312 of the fixing plate 31, and another workpiece 80 can be arranged on the rectangular rim 25*a* to locate at the working position. Subsequently, the four cutting devices 30 can be used to cut another workpiece 80 in a manner similar the manner cutting the above mentioned workpiece 80.

In this embodiment, when the portion 90 held on the peripheral surface 230 is rotated to face away from the second side board 116 of the chamber 10, the suction nozzles 23*a* stop providing suction force. The workpiece 80 (the portion 90 have been separated from the workpiece 80) thus can be held by for example a suction nozzle and moved out of the chamber 10. It is noted, when the workpiece 80 is rotated to face away from the bottom board 116 of the chamber 10, the workpiece 80 can be detached from the supporting frame 25 due to gravity, and falls off to the bottom board 110. In such case, a clean up member, such as a brush 93 (see FIG. 3) can be provided to clean up the workpiece 80 out of the receiving space 10*a* of the chamber 10.

During cutting the workpiece 80, the cooling device 95 can be used to cool the cutting blade 35 and the workpiece 80, thus the workpiece 80 can be prevent from being overheated. In this embodiment, when the cutting blade 35 cuts the workpiece 80, the coolant is ejected from the first nozzle 9520 to the cutting blade 35 and the workpiece 80 to cool the cutting blade 35 and workpiece 80. It is noted, the coolant can be used to wash away chips, which are generated when the cutting blade 35 cuts the workpiece 80. In addition, when the portion 90 is rotated to locate adjacent to the second nozzle 9522, the coolant can be ejected from the second nozzle 9522 to clean the portion 90, thus attaining a portion 90 with good surface cleanliness.

In this embodiment, the portion 90 can be used to manufacture an infrared (IR) cut-off filter by forming IR cut-off films on a surface thereof. In alternative embodiments, the portion 90 may be used in another application, for example, the portion 90 can be machined to be a lens.

One advantage of the cutting apparatus 100 is that the cross section of the cutting blade 35 is annular, thus a round portion 90 with good circularity can be cut from the portion 90 by using the cutting blade 35, and the portion 90 can be separated from the portion 90 by the ejection bar 37. Another advantage of the cutting apparatus 100 is that the recesses 35*a* defined in the cutting blade 35 can be used to receive the chips, thus the portion 90 is protected from being damaged or polluted by the chips.

It is understood that the above-described embodiment are intended to illustrate rather than limit the disclosure. Variations may be made to the embodiment without departing from the spirit of the disclosure. Accordingly, it is appropriate that the appended claims be construed broadly and in a manner consistent with the scope of the disclosure.

What is claimed is:

1. A cutting device comprising:

a fixing plate defining a first through hole;

a revolving cylinder threadedly engaged in the first through hole of the fixing plate, the revolving cylinder defining a second through hole;

an annular cutting blade defining a third through hole, the cutting blade being attached to an end of the revolving cylinder with the third through hole thereof being coaxially aligned with the second through hole, wherein the revolving cylinder is rotatable relative to the fixing plate to move the cutting blade between an extended position where the cutting blade cuts a workpiece to create a round blind crack in the surface thereof, a portion of the workpiece being surrounded by the blind crack, and a retracted position where the cutting blade is moved away from the workpiece; and an ejection bar slidably engaged in the second through hole and the third through hole, the ejection bar configured for pushing the surrounded portion out of the workpiece.

2. The cutting device of claim 1, wherein the cutting blade comprises an inner surface in the third through hole, and an end face facing away from the revolving cylinder and adjoining the inner surface, and the cutting blade has a plurality of recesses defined in the inner surface, the recesses are exposed at the end face.

3. The cutting device of claim 1, wherein the ejection bar comprises a base portion and a protruding portion protruding from the base portion, the protruding portion is fittingly received in the second through hole and the third through hole, the base portion is configured for restraining movement of the protruding portion in the second through hole and the third through hole.

4. A cutting apparatus comprising:

a positioning mechanism comprising a drive shaft and a supporting frame, the drive shaft extending through the supporting frame, the drive shaft being configured for rotating the supporting frame thereabout, the supporting frame being configured for supporting a plurality of workpieces; and a cutting device comprising:

a fixing plate defining a first through hole;

a revolving cylinder threadedly engaged in the first through hole of the fixing plate, the revolving cylinder defining a second through hole;

an annular cutting blade facing toward the supporting frame, the cutting blade defining a third through hole, the cutting blade being attached to an end of the revolving cylinder with the third through hole thereof being coaxially aligned with the second through hole, wherein the revolving cylinder is rotatable relative to the fixing plate to move the cutting blade between an extended position where the cutting blade cuts a workpiece to create a round blind crack in the surface thereof, a portion of the workpiece being surrounded by the blind crack, and a retracted position where the cutting blade is moved away from the workpiece; and an ejection bar slidably engaged in the second through hole and the third through hole, the ejection bar configured for pushing the surrounded portion out of the workpiece.

5. The cutting apparatus of claim 1, wherein the supporting frame comprises a plurality of outwardly facing rectangular recesses around the drive shaft, the recesses configured for receiving the workpieces.

6. The cutting apparatus of claim 5, wherein the positioning mechanism comprises:

a plurality of suction nozzles arranged in each of the recesses, the suction nozzles configured for providing a suction force to hold the workpieces on the supporting frame.

7. The cutting apparatus of claim 6, wherein the supporting frame is a polygonal prism.

8. The cutting apparatus of claim 4, wherein the cutting blade comprises an inner surface in the third through hole, and an end face facing away from the revolving cylinder and adjoining the inner surface, and the cutting blade has a plurality of recesses defined in the inner surface, the recesses are exposed at the end face.

9. The cutting apparatus of claim 4, wherein the ejection bar comprises a base portion and a protruding portion protruding from the base portion, the protruding portion is fittingly received in the second through hole and the third through hole, the base portion is configured for restraining movement of the protruding portion in the second through hole and the third through hole.

10. The cutting apparatus of claim 4, further comprising a cooling device configured for spraying coolant to at least one of the substrate and the cutting blade.

11. The cutting apparatus of claim 4, further comprising a chamber for receiving the positioning mechanism and the cutting device.

12. A cutting apparatus comprising:

a positioning mechanism comprising a drive shaft and a supporting frame coupled to the drive shaft, the drive shaft being configured for rotating the supporting frame, the supporting frame being configured for supporting a workpiece; and a cutting device comprising:

a fixing plate defining a first through hole, a revolving cylinder threadedly engaged in the first through hole of the fixing plate, the revolving cylinder defining a second through hole, an annular cutting blade comprising an end face facing away from the revolving cylinder, the annular cutting blade defining a third through hole in the end face and a plurality of recesses in an inner surface in the third through hole, the recesses being exposed at the end face, the cutting blade being attached to an end of the revolving cylinder with the third through hole being coaxially aligned with the second through hole, wherein the revolving cylinder is rotatable relative to the fixing plate to move the cutting blade between an extended position where the cutting blade can cut a surface of a workpiece to create a round blind crack in the surface of the workpiece, the round blind crack surrounding a predetermined portion of the workpiece, and a retracted position where the cutting blade is moved away from the workpiece, and an ejection bar slidably engaged in the second through hole and the third through hole, the ejection bar configured for pushing the predetermined portion out of the workpiece.

13. The cutting apparatus of claim 12, wherein the supporting frame comprises a plurality of outwardly facing rectangular recesses around the drive shaft, the recesses configured for receiving the workpieces.

14. The cutting apparatus of claim 13, wherein the positioning mechanism comprises:

a plurality of suction nozzles arranged in each of the recesses, the suction nozzles configured for providing a suction force to hold the workpieces on the supporting frame.

15. The cutting apparatus of claim 14, wherein the supporting frame is a polygonal prism.

16. The cutting apparatus of claim 12, wherein the ejection bar comprises a base portion and a protruding portion protruding from the base portion, the protruding portion is fittingly received in the second through hole and the third through hole, the base portion is configured for restraining movement of the protruding portion in the second through hole and the third through hole.

17. The cutting apparatus of claim 12, further comprising a cooling device configured for spraying coolant to at least one of the substrate and the cutting blade.

18. The cutting apparatus of claim 12, further comprising a chamber for receiving the positioning mechanism and the cutting device.

* * * * *